UNITED STATES PATENT OFFICE.

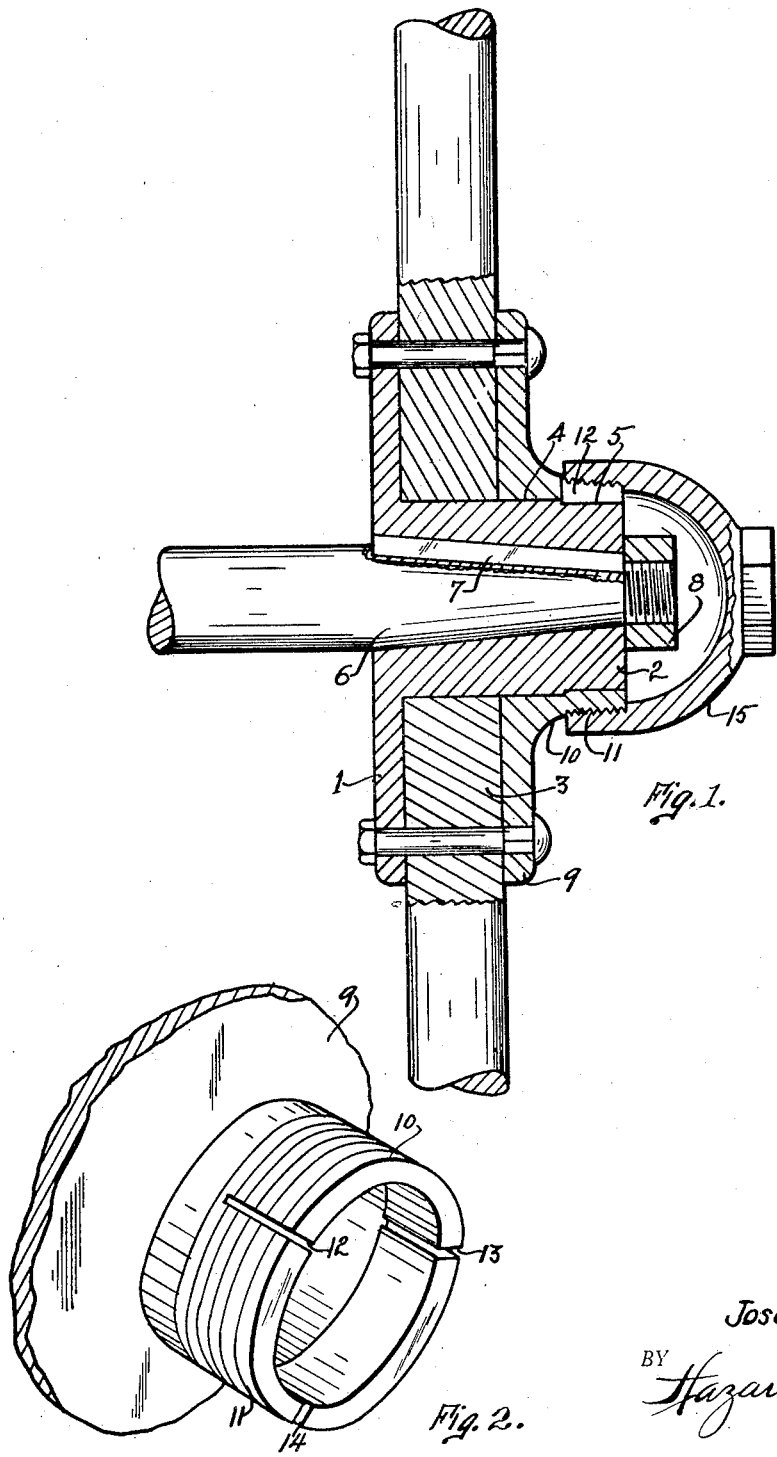

JOSEPH LEROY HANNEGAN, OF LOS ANGELES, CALIFORNIA.

HUB-FLANGE FOR MOTOR-VEHICLES.

1,381,635.  Specification of Letters Patent.  Patented June 14, 1921.

Application filed October 4, 1919. Serial No. 328,584.

*To all whom it may concern:*

Be it known that I, JOSEPH LEROY HANNEGAN, a citizen of the United States, residing at Los Angeles, in the county of Los Angeles and State of California, have invented new and useful Improvements in Hub-Flanges for Motor-Vehicles, of which the following is a specification.

My object is to make a hub flange for motor vehicle wheels, and my invention consists of the novel features herein shown, described and claimed.

Figure 1 is an enlarged sectional detail showing the hub and the hub flange assembled.

Fig. 2 is a fragmentary perspective of the hub flange.

The inner flange 1 is formed integral with the hub 2 and the hub 2 extends outwardly through the wheel and to some distance outside of the outer faces of the spokes 3. The hub 2 has a cylindrical portion 4 extending outwardly from the spokes 3 and a reduced cylindrical portion 5 extending outwardly from the portion 4.

The axle spindle 6 is fixed in the hub 2 by a key 7 and a nut 8. Heretofore it has been the practice to place the flange against the outer faces of the spokes 3 around the outer part of the hub 2 and then apply a nut directly to the extreme outer part of the hub 2 against the flange. In actual practice this construction has been found defective and it is my object to overcome the defect.

The outer flange 9 fits against the outer faces of the spokes 3 and fits tightly around the hub 2 upon the face 4 and the screw-threaded nipple 10 extends from the flange 9 and fits closely around the face 5 of the hub 2. The external screw-threads 11 upon the nipple are tapered and the nipple has radial slots 12, 13 and 14 extending longitudinally from its outer end. The cap nut 15 fits upon the nipple 10 and fits tight enough so that when the cap nut 15 is screwed upon the nipple 10 the nipple is contracted to grip the face 5 of the hub 2 thereby holding the flange 9 rigid relative to the hub 2.

Various changes may be made without departing from the spirit of my invention as claimed.

I claim:

A hub flange for vehicle wheels comprising in combination with an inner flange, a hub extending from the inner flange, spokes fitting the inner flange around the hub, of an outer flange fitting against the outer faces of the spokes and secured to the inner flange by fastening devices passing through the spokes, an externally screw-threaded tapered nipple formed integral with the outer flange and extending therefrom closely upon the hub, radial longitudinal slots in said nipple extending inwardly from its outer end, and an internally taper threaded cap adapted to screw tightly upon the nipple to contract it to grip the hub.

In testimony whereof I have signed my name to this specification.

JOSEPH LEROY HANNEGAN.